(No Model.) 2 Sheets—Sheet 1.
H. GOTTSCHALK & T. HEMEKE.
MEASURING DEVICE.
No. 601,465. Patented Mar. 29, 1898.
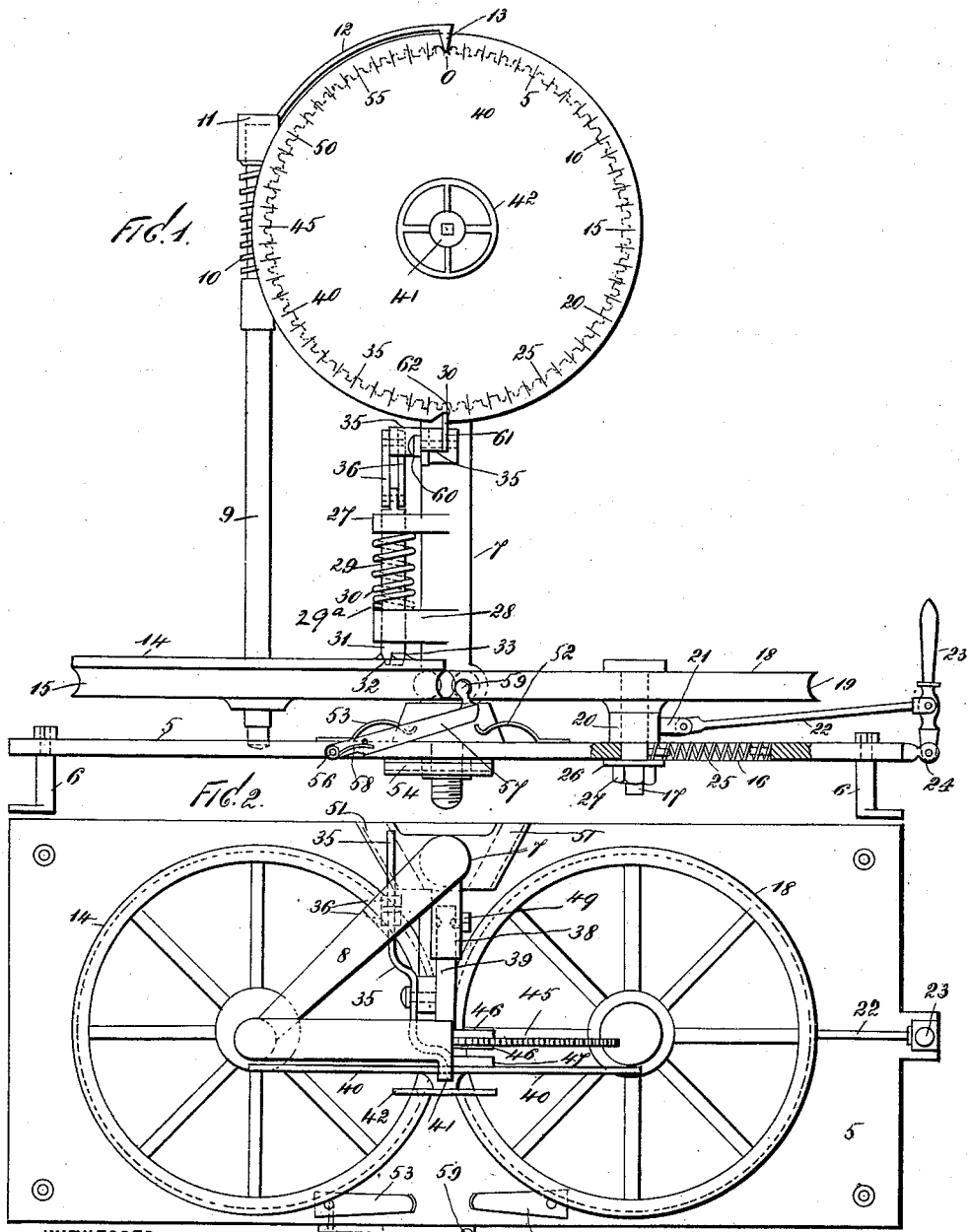

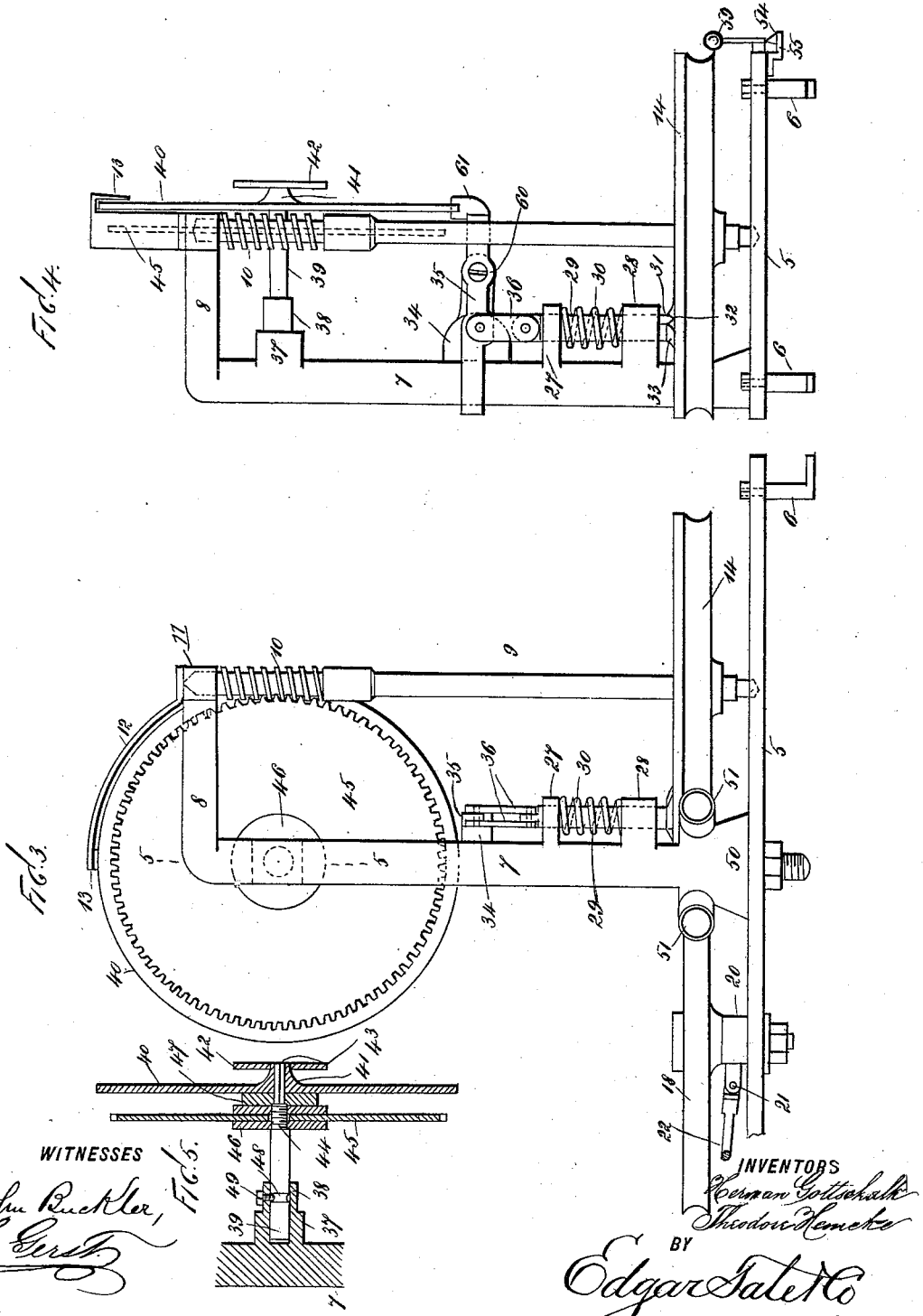

UNITED STATES PATENT OFFICE.

HERMAN GOTTSCHALK AND THEODORE HEMEKE, OF BROOKLYN, NEW YORK.

MEASURING DEVICE.

SPECIFICATION forming part of Letters Patent No. 601,465, dated March 29, 1898.

Application filed December 4, 1896. Serial No. 614,426. (No model.)

*To all whom it may concern:*

Be it known that we, HERMAN GOTTSCHALK and THEODORE HEMEKE, citizens of the United States, residing at Brooklyn, in the county of Kings and State of New York, have invented certain new and useful Improvements in Measuring Devices, of which the following is a full and complete specification, such as will enable those skilled in the art to which it appertains to make and use the same.

This invention relates to measuring devices, and particularly to devices for measuring lines, such as clothes-lines and other cords and ropes; and the object thereof is to provide an improved device of this class which may be used in stores and other places and by means of which cords, ropes, and lines or portions thereof may be quickly and easily measured, a further object being to provide a device of the class specified which may also be used for measuring tape and other and similar articles.

The invention is fully disclosed in the following specification, of which the accompanying drawings form a part, in which—

Figure 1 is a front view of our improved measuring device; Fig. 2, a plan view thereof; Figs. 3 and 4, back and side views, respectively; and Fig. 5, a section on the line 5 5 of Fig. 3, showing details of the construction.

In the drawings forming part of this specification the separate parts of our improvement are designated by the same numerals of reference throughout the several views, and in the practice of our invention we provide a measuring device which comprises a base-plate 5, which is provided with legs or supports 6, and mounted centrally of the rear portion thereof is an upright standard 7, which is provided at its upper end with an arm 8, which projects at an angle of about forty-five degrees to the transverse center of the base-plate, and parallel with said base-plate and mounted between the outer end of said arm and the base-plate is a revoluble shaft 9, the upper end of which is provided with a worm-gear, as shown at 10.

The end of the arm 8 is provided with a head 11, in which the upper end of the shaft 9 revolves, and the lower end of said shaft is suitably mounted in the base-plate. The head 11 of the arm 8 also carries a segmental arm 12, which is provided at its free end with a downwardly-directed pointer 13, and mounted on the lower end of the shaft 9 and revoluble therewith is a wheel 14, which is provided in its perimeter with a groove 15.

The end of the base-plate 5 opposite the base of the shaft 9 is provided with a longitudinal slot 16, Fig. 1, and mounted therein is a short shaft 17, on which is revolubly mounted a wheel 18, which is in the same plane as the wheel 14, and which is also provided with a groove 19 in its perimeter, and mounted on the shaft 17, below the wheel 18, is a collar 20, the outer side of which is provided with a shoulder or projection 21, to which is pivoted a rod 22, which is pivotally connected with a lever 23, which is pivoted to the end of the base-plate at 24, and mounted in the slot 16, between the shaft 17 and the outer end of said slot, is a strong spiral spring 25, which operates to force the shaft 17 inwardly, and mounted on said shaft below the base-plate is a washer 26, which is secured in place by a nut 27, which also serves to hold the shaft 17 in position, and by means of the collar 20 and the washer 26 the said shaft is securely held in an upright position while being free to slide in the slot 16, and by depressing the lever 23 the shaft 17 with the wheel 18 may be drawn outwardly, and when the lever is released the said shaft and wheel will be forced inwardly into the position shown in Fig. 1.

The lower end of the standard 7 is provided with shoulders or projections 27 and 28, in which is mounted a vertically-movable bolt 29, on which is placed a spiral spring 30, one end of which bears on the upper shoulder or projection 27 and the other upon a shoulder or projection 29ª, secured to said bolt, and the operation of the spring 30 is to force the bolt 29 downwardly, and the lower end of the bolt 29 is wedge-shaped in form, as shown at 31 in Figs. 1 and 4, and is adapted to enter a notch or recess 32, formed in the upper side of the perimeter of the wheel 14 or in an upwardly-directed shoulder or projection 33, formed thereon. The shoulders or projections 27 and 28 extend in the direction of the shaft 9, and the standard 7 is also provided, above said shoulders or projections, with a forwardly-directed arm 34, to which is pivoted a lever 35, which projects forwardly and backwardly and which is connected with the upper end of the bolt 29 by pivoted links 36. The standard 7 is also provided, near its upper end, with a forwardly-directed shoulder or projection 37, provided with a tubular extension 38, in which is mounted a shaft 39, on the outer end of which is mounted a scale-disk 40, provided centrally of its front side with a hub 41.

The outer end of the shaft 39 is reduced in size and angular in cross-section and is provided with a disk or wheel 42, by which it is turned, and the scale-disk 40 revolves therewith, and the shaft 39, adjacent to the reduced extension 43 thereof, is screw-threaded, as shown at 44, and mounted thereon is a gear-wheel 45, and at each side of the gear-wheel 45 is a washer 46, each of which is mounted on the screw-threaded portion of the shaft 39, and adjacent to the inner side of the scale-disk 40 is another washer 47.

The end of the shaft 39 within the tubular extension 38 of the shoulder or projection 37 is provided with an annular groove 48, and passing through said tubular extension is a set-screw 40, which operates in said groove.

The scale-disk 40 revolves with the shaft 39, and the gear-wheel 45 may be revolved thereon and is also adapted to revolve therewith, being tightly held by the washers 46, and the gear-wheel 45 is adapted to be operated by the worm-gear 10 on the vertical shaft 9.

The lower end of the standard 7 is provided with an enlarged head 50, and projecting rearwardly therefrom, at the opposite sides thereof, are tubular guides 51, and in practice the end of the rope, cord, or other article to be measured may be passed through either of the said guides and between the wheels and may be measured as desired, and secured to the front of the base-plate 5 are springs 52 and 53, beneath either one of which the rope, cord, or other article may be passed when not being measured, and secured to the front of the base-plate and centrally thereof is a cutting-blade 54, which is supported by an arm or bracket 55, said arm or bracket being secured to the bottom of the base-plate, and pivoted to the front edge of the base-plate at 56 is another plate 57, which is held in a raised position, as shown in Fig. 1, by a spring 58, and the forward end of the blade 57 is provided with a knob or handle 59.

The forward end of the lever 35, which is pivoted to the arm 34 of the standard 7 at 60, is provided with an upwardly-directed lug or projection 61, and is intended to operate in a notch or recess 62, formed in the perimeter of the scale-disk, and the operation will be readily understood from the foregoing description when taken in connection with the accompanying drawings and the following statement thereof.

The scale-disk 40 represents yards, and it will be understood that the line, cord, or other article to be measured is mounted on a suitable reel or other support back of the measuring device, and when it is desired to measure the same or a portion thereof the rear end of the lever 35 is raised, so as to disengage the front end thereof from the scale-disk, and said scale-disk is turned to the left by hand until the pointer 13 indicates the number of yards required. The end of the line, cord, or other article is then passed through one of the guides 51, between the wheels 14 and 18, and the end thereof is grasped and pulled through between said wheels, and this operation revolves said wheels, together with the vertical shaft 9, and said vertical shaft revolves the gear-wheel 45 and the scale-disk, said scale-disk being revolved to the right, and when the pointer 13 reaches the zero-mark the lever 35 stops the scale-disk and the operation of the device, after which the line, cord, or other article is passed between the blades 57 and 54, and by depressing the blade 57 the same will be cut off.

At the same time that the lug or projection 61 on the forward end of the lever 35 enters the notch or recess 62 in the scale-disk and stops the revolution thereof, or immediately after said time, the lower end of the spring-operated rod 29 enters the notch or recess 32 in the upper side of the perimeter of the wheel 14 and stops said wheel, and the cord, line, or other article cannot be pulled farther through between the wheels 14 and 18 without applying such force thereto as to show or indicate that the scale-disk has been stopped.

The disk 40 may be reset whenever desired by turning the disk or wheel 42, and it will thus be seen that we provide an effective measuring device which is simple in construction and operation and well adapted to produce the result for which it is intended, and it is evident that changes in and modifications of the construction herein described may be made without departing from the spirit of our invention or sacrificing its advantages.

Although we have shown the wheels 14 and 18 as provided with grooves in their perimeters, this form of construction is not absolutely necessary, and if the device were intended for measuring tape and similar articles said wheels would be provided with smooth perimeters, and we may also provide said wheels with rubber facings or rims, so as to increase the friction, or the perimeters of the wheels may be roughened or serrated for the same purpose.

Having fully described our invention, we claim as new and desire to secure by Letters Patent—

In a measuring device a base-plate, standard mounted thereon an arm secured to the upper end of said standard and projecting therefrom in the direction of one end of said base, a vertical shaft engaging at its upper end said head and suitably mounted upon said base-plate a wheel journaled near the lower end of said shaft, a second wheel adjustably mounted in the opposite end of said base and adapted to peripherally engage said first wheel, a shoulder on said standard, a bolt passing therethrough, a spring surrounding said bolt and adapted to press the same downwardly, a disk in engagement with the upper portion of said standard, a wheel engaging said disk provided with a suitable gear in the periphery thereof, a worm on said perpendicular shaft engaging said latter wheel and means engaging said bolt and disk for automatically registering or measuring any suitable lengths substantially as shown and described.

In testimony that we claim the foregoing as our invention we have signed our names, in presence of the subscribing witnesses, this 1st day of December, 1896.

HERMAN GOTTSCHALK.
THEODORE HEMEKE.

Witnesses:
CHARLES S. ROGERS,
A. L. PICKARD.